(12) United States Patent
Crowne (10) Patent No.: US 10,598,537 B2
(45) Date of Patent: Mar. 24, 2020

(54) SYSTEMS AND METHODS FOR LIQUID LEVEL DETECTION WITH OPTOELECTRONIC INTERFACED DUAL THERMISTOR BEAD SENSOR

(71) Applicant: Simmonds Precision Products, Inc., Vergennes, VT (US)

(72) Inventor: David H. Crowne, Weybridge, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 107 days.

(21) Appl. No.: 14/973,687

(22) Filed: Dec. 17, 2015

(65) Prior Publication Data

US 2017/0176235 A1 Jun. 22, 2017

(51) Int. Cl.
*G01F 23/24* (2006.01)
*G01F 23/00* (2006.01)
*B64D 37/00* (2006.01)

(52) U.S. Cl.
CPC .......... *G01F 23/246* (2013.01); *B64D 37/00* (2013.01); *G01F 23/00* (2013.01); *G01F 23/0007* (2013.01); *G01F 23/241* (2013.01); *G01F 23/243* (2013.01); *G01F 23/0061* (2013.01)

(58) Field of Classification Search
CPC .......... G01F 23/246–248; G01K 1/024; G01K 7/22–25
USPC .................. 73/292, 295, 77, 204.25, 204.27; 340/622; 374/E1.004, E7.018, E7.028; 324/694
See application file for complete search history.

(56) References Cited

U.S. PATENT DOCUMENTS 2,914,685 A * 11/1959 McVey ............... H03K 4/58
327/137
3,492,586 A * 1/1970 Leffmann ............ G01K 1/00
257/467
3,558,853 A * 1/1971 Schluntz ........... G03G 15/2003
219/216

(Continued)

FOREIGN PATENT DOCUMENTS

EP 0386965 A1 * 9/1990 ............... G01D 5/12
EP 0386965 A1 9/1990

OTHER PUBLICATIONS

Extended European Search Report dated May 2, 2017, issued during the prosecution of European Patent Application No. EP16204402.8 (13 pages).

(Continued)

*Primary Examiner* — Peter J MacChiarolo
*Assistant Examiner* — David L Singer
(74) *Attorney, Agent, or Firm* — Locke Lord LLP; Scott D. Wofsy; Georgi Korobanov (57) ABSTRACT

A liquid level detection system for determining a liquid level includes a level sensor configured to be at least partially disposed in a liquid storage vessel and exposed to liquid. A first optoelectronic interface is operatively connected to the level sensor for providing power thereto. A second optoelectronic interface is operatively connected to the first optoelectronic interface. A fiber optic cable optically connects the first optoelectronic interface to the second optoelectronic interface to provide photonic power to the first optoelectronic interface and to transmit data from the first optoelectronic interface to the second optoelectronic interface.

13 Claims, 4 Drawing Sheets

(56) References Cited

U.S. PATENT DOCUMENTS

| | | | |
|---|---|---|---|
| 4,392,782 A * | 7/1983 | Kuehn | E21B 43/128 307/118 |
| 4,531,046 A * | 7/1985 | Stover | A47J 31/56 392/442 |
| 4,820,916 A | 4/1989 | Patriquin | |
| 4,963,729 A * | 10/1990 | Spillman | G01D 5/12 250/227.21 |
| 5,031,453 A * | 7/1991 | Kline | G01F 23/263 307/118 |
| 5,049,825 A * | 9/1991 | Kline | G01F 23/263 324/660 |
| 5,162,935 A * | 11/1992 | Nelson | H04B 10/25 250/227.21 |
| 5,399,875 A * | 3/1995 | Crowne | G01F 23/0061 250/577 |
| 5,528,409 A * | 6/1996 | Cucci | H04B 10/807 398/113 |
| 5,627,380 A * | 5/1997 | Crowne | G01F 23/0061 250/577 |
| 5,685,194 A * | 11/1997 | McCulloch | G01F 1/696 73/204.11 |
| 5,723,870 A * | 3/1998 | Crowne | B64D 37/00 250/221 |
| 5,814,830 A | 9/1998 | Crowne | |
| 6,270,463 B1 * | 8/2001 | Morris, Sr. | G01K 1/024 374/E1.004 |
| 6,644,103 B1 * | 11/2003 | Hall | G01F 23/246 324/664 |
| 6,662,650 B1 * | 12/2003 | Durkee | G01F 23/247 340/604 |
| 6,670,601 B1 | 12/2003 | Wyler | |
| 6,744,036 B2 * | 6/2004 | Kline | G01F 23/0061 250/227.11 |
| 7,356,209 B2 | 4/2008 | Delcher et al. | |
| 7,638,750 B2 | 12/2009 | Kline | |
| 7,806,603 B2 | 10/2010 | Izumo et al. | |
| 7,965,948 B1 | 6/2011 | Bugash et al. | |
| 2004/0061043 A1 | 4/2004 | Kline | |
| 2004/0080423 A1 * | 4/2004 | Hall | G01F 23/246 340/604 |
| 2004/0108863 A1 | 6/2004 | Pelkey | |

OTHER PUBLICATIONS

Extended European Search Report dated May 31, 2019 (received May 28, 2019), issued during the prosecution of European Patent Application No. EP 18209640.4.

* cited by examiner

SYSTEMS AND METHODS FOR LIQUID LEVEL DETECTION WITH OPTOELECTRONIC INTERFACED DUAL THERMISTOR BEAD SENSOR

BACKGROUND OF THE INVENTION

1. Field of the Invention

The present invention relates to level detection systems, in particular to fuel level detection systems.

2. Description of Related Art

Traditional liquid level measurement systems may use liquid level sensors to determine the point level of a liquid in the storage vessel. In some liquid measurement applications, such as fuel level in aircraft, for instance, precise knowledge of fuel level is needed to support, for example, automatic shutoff during refueling, independent low level warnings, and/or transfers between fuel storage tanks. One way of taking point level measurements is by using thermistor beads. Typically, these are negative temperature coefficient, wire wound resistors that are excited with a steady state current. Heat dissipation of the thermistor bead changes according to the wet/dry state of the bead, which in turn changes its resistance. This is sensed as a voltage change across the thermistor bead. Additionally, the response of two different thermistor beads operated at two different current levels can differentiate between the cold-dry and hot-wet conditions using lower current than that typically required to discriminate between these two conditions using a single thermistor.

Such conventional methods and systems have generally been considered satisfactory for their intended purpose. However, there is still a need in the art for systems and methods that allow for improved liquid level sensing, for example, systems in flammable environments. The present invention provides a solution for these problems.

SUMMARY OF THE INVENTION

A liquid level detection system for determining a liquid level includes a level sensor configured to be at least partially disposed in a liquid storage vessel and exposed to liquid. A first optoelectronic interface is operatively connected to the level sensor for providing power thereto. A second optoelectronic interface is operatively connected to the first optoelectronic interface. A fiber optic cable optically connects the first optoelectronic interface to the second optoelectronic interface to provide photonic power to the first optoelectronic interface and to transmit data from the first optoelectronic interface to the second optoelectronic interface.

In accordance with some embodiments, the level sensor includes a dual thermistor bead sensor. The first optoelectronic interface can include a power converter in optical communication with the fiber optic cable to convert photonic power to electrical power. The first optoelectronic interface can include an energy storage component in electrical communication with the power converter to store electrical energy converted by the power converter. The first optoelectronic interface can include a signal conditioning circuit operatively connected to the energy storage component and the level sensor to provide electrical power to the level sensor and to receive voltage readings therefrom. The voltage readings can be indicative of a liquid level in a liquid storage vessel.

The first optoelectronic interface can include a pulse driver operatively connected to an output of the signal conditioning circuit to signal an optical transmitter to pulse based on electrical pulses received from the signal conditioning circuit. The optoelectronic interface can include an optical transmitter operatively connected to the pulse driver to generate photonic power pulses. An output of the optical transmitter can be coupled to the fiber optic cable to provide the photonic power pulses to the second optoelectronic interface indicative of a liquid level in a liquid storage vessel. The second optoelectronic interface can include a photodiode operatively connected to the fiber optic cable to receive photonic power pulses therefrom and to generate corresponding electrical pulses. The system can include a module electrically coupled to the photodiode of the second optoelectronic interface to determine a liquid level based on electrical pulses received from the photodiode. It is contemplated that the fiber optic cable can be a single fiber optic cable configured to transmit optical power from the second optoelectronic interface to the first optoelectronic interface and to a signal conditioning circuit of the first optoelectronic interface. The single fiber optic cable can transmit data from the signal conditioning circuit of the first optoelectronic interface to the second optoelectronic interface.

In accordance with another aspect, a method for detecting a liquid level in a liquid storage vessel includes providing photonic power to a first optoelectronic interface through a fiber optic cable. The method includes converting the photonic power to electrical power using a power converter and providing the electrical power to a signal conditioning circuit to apply a voltage across a level sensor during a measurement cycle. The method includes generating an electrical pulse with the signal conditioning circuit based on at least one voltage reading from the level sensor during the measurement cycle. The method includes determining a liquid level based on the electrical pulse using a module in a second optoelectronic interface. The second optoelectronic interface is operatively connected to the first optoelectronic interface through the fiber optic cable.

In accordance with certain embodiments, the level sensor includes a thermistor bead. Generating the electrical pulse with the signal conditioning circuit can include generating a thermistor bead pulse by comparing an actual thermistor bead voltage to a ramp voltage. The method can include generating two additional electrical pulses with the signal conditioning circuit. One of the two additional electrical pulses can include a start pulse generated at a start of the measurement cycle. The other of the two additional electrical pulses can include a framing pulse generated by comparing the ramp voltage to a reference voltage. The start and framing pulses can encode a full scale of possible thermistor bead voltages as delta time, and the thermistor bead pulse can define a fractional thermistor bead voltage based on the actual thermistor bead voltage encoded as time relative to the full scale.

In accordance with some embodiments, the actual thermistor bead voltage is a first actual thermistor bead voltage the fractional thermistor bead voltage is a first fractional thermistor bead voltage. The level sensor can include a second thermistor bead wherein generating the electrical pulse with the signal conditioning circuit can include generating a second thermistor bead pulse by comparing a second actual thermistor bead voltage to the ramp voltage. The second thermistor bead pulse can define a second fractional thermistor bead voltage based on the second actual thermistor bead voltage encoded as time relative to the full scale. Determining the liquid level based on the electrical pulse using the module can include comparing the difference between the first and second fractional thermistor bead voltages to a threshold value to determine whether the level sensor is wet or dry.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
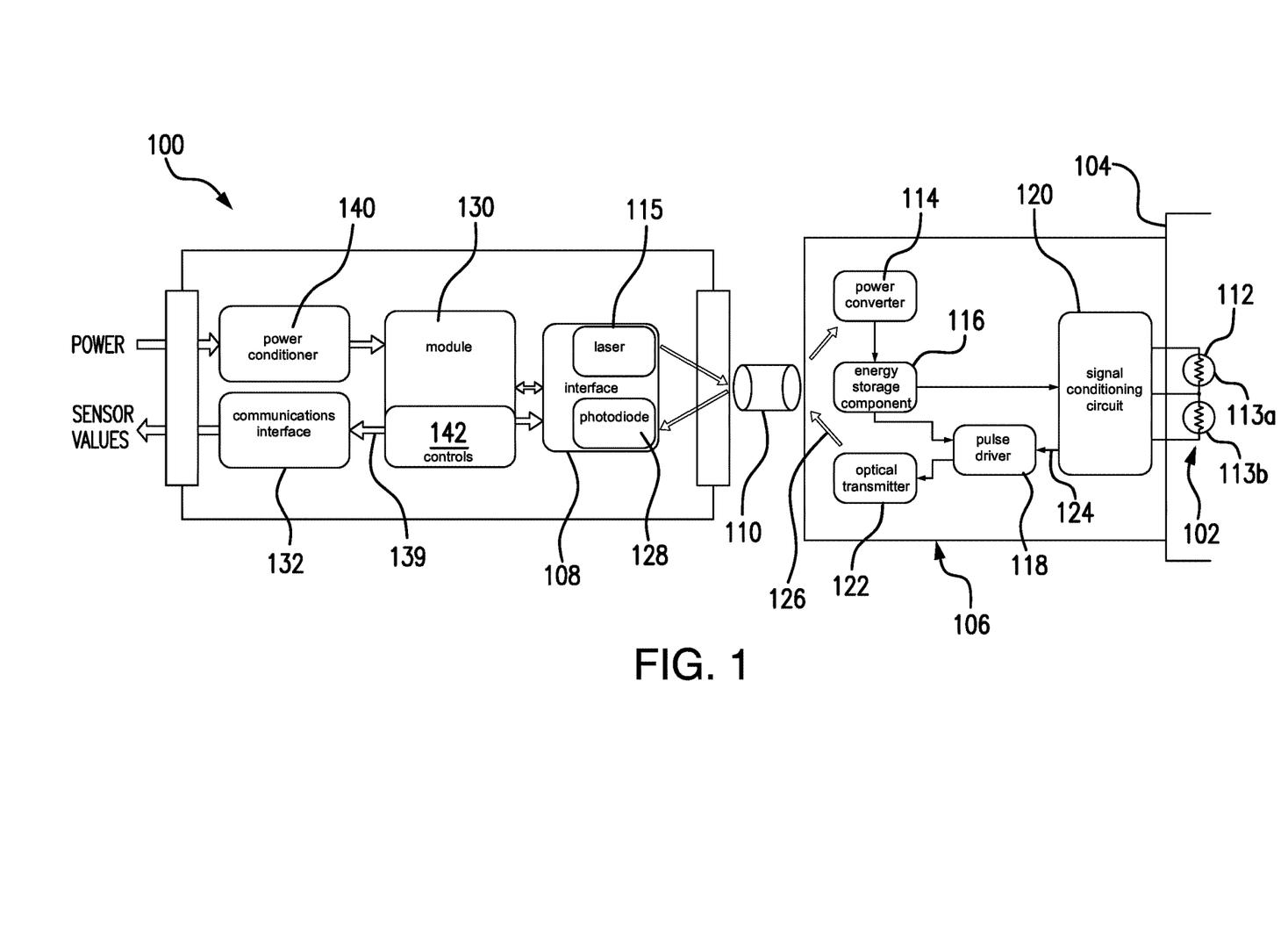
FIG. 1 is a schematic depiction of an exemplary embodiment of a liquid level detection system constructed in accordance with the present disclosure.

Reference will now be made to the drawings wherein like reference numerals identify similar structural features or aspects of the subject disclosure. For purposes of explanation and illustration, and not limitation, a schematic depiction of an exemplary embodiment of a liquid level detection system in accordance with the disclosure is shown in FIG. 1 and is designated generally by reference character 100. Other embodiments of liquid level detection systems in accordance with the disclosure, or aspects thereof, are provided in FIGS. 2-5, as will be described. Embodiments of the present invention electrically isolate the level sensor to remove means by which an electrical fault or external condition like lightning could couple onto electrical conductors, e.g. those found in traditional systems, and effect the thermistor beads.

As shown in FIG. 1, a liquid level detection system 100 includes a level sensor 102 configured to be at least partially disposed in a liquid storage vessel 104 and exposed to liquid. The level sensor 102 is a dual thermistor bead point level sensor 112 with two beads 113a and 113b. Level sensor 102 is disposed in liquid storage vessel 104 at a known point to determine whether there is liquid at that point. A first optoelectronic interface 106 is operatively connected to the level sensor 102 for providing power thereto. A fiber optic cable 110 optically connects the first optoelectronic interface 106 to a second optoelectronic interface 108. The second optoelectronic interface 108 provides photonic power to the first optoelectronic interface 106 through the fiber optic cable 110. The first optoelectronic interface 106 transmits data to the second optoelectronic interface 108 through the fiber optic cable 110.

The optical communication through fiber optic cable 110 isolates the first optoelectronic interface 106 from the second optoelectronic interface 108, e.g. there is no electrical communication between the first optoelectronic interface 106 from the second optoelectronic interface 108. Because fiber optic cable 110 isolates the first optoelectronic interface 106 and level sensor 102 from the primary power source through the second optoelectronic interface 108, it is contemplated that fiber optic cable 110 can be run anywhere around and/or within the fuel tank without regard to electrical clearance. Thus, the connection to the sensor 102 becomes non-conductive and cannot propagate electrical faults or threats, making it possible for the sensor 102 to be located anywhere within the liquid storage vessel 104 without compromising electrical safety.

With continued reference to FIG. 1, the first optoelectronic interface 106 includes a power converter 114 in optical communication with the fiber optic cable 110 to convert photonic power to electrical power. An energy storage component 116 is in electrical communication with the power converter 114 to store electrical energy converted by the power converter 114. Optical power, e.g. photonic power, is provided via a laser 115. In accordance with one embodiment, the laser 115 is a 100 mW Vertical Cavity Surface Emitting Laser (VCSEL). It is contemplated that the fiber optic connector and fiber choice of fiber optic cable 110 can be configured such that ~90 Mw of optical power is launched into the fiber optic cable 110 core. This allows for at least 85 mW to be available at the power converter 114 in the first optoelectronic interface 106. For example, the power converter 114 can be a single or multiple cell photodiode with an efficiency of about 40%, leaving ~35 mW of electrical power to operate sensor electronics, described below, in a continuous mode. It is contemplated that system 100 can include a power conditioner 140 to decrease and modulate power where eye safety in the event of a fiber break is a concern or where the properties of the environment are such that lower power is a necessity such as in an aircraft fuel tank. For example, applied power from the VCSEL can be decreased by half and the sensor electronics, described in more detail below, can be operated at a duty cycle that supports the application.

Figure 2:
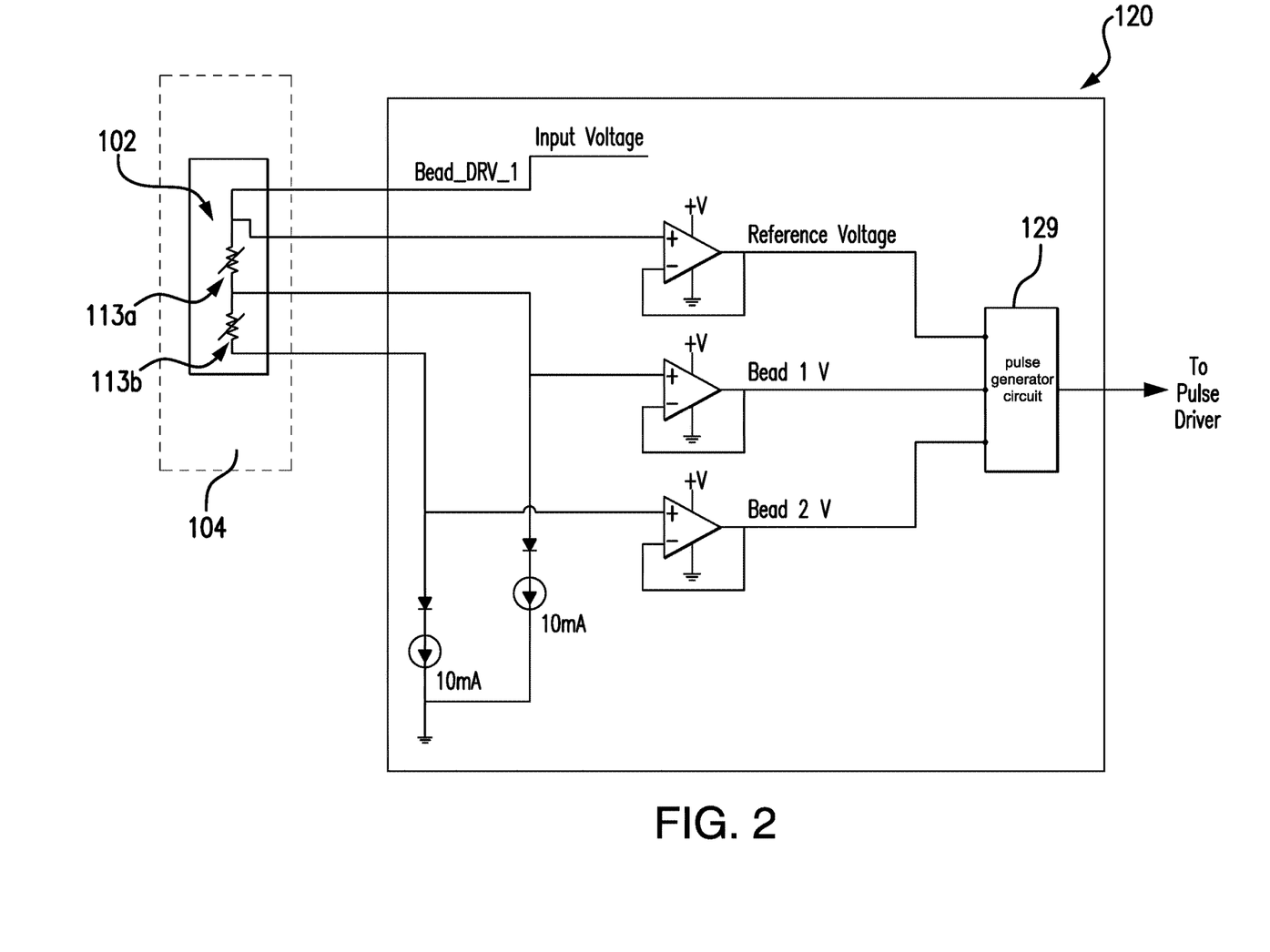
FIG. 2 is a schematic depiction of a portion of the liquid level detection system of FIG. 1, showing the signal conditioning circuit.

With reference now to FIGS. 1 and 2, the first optoelectronic interface 106 includes a signal conditioning circuit 120 operatively connected to the energy storage component 116 and the level sensor 102 to provide electrical power to the level sensor 102 and to receive voltage readings therefrom, e.g. a reference voltage, a first bead voltage and a second bead voltage. The bead voltage readings are indicative of a temperature of each of the respective thermistor beads 113a and 113b, and these temperature readings are used to determine the liquid level in the liquid storage vessel 104, e.g. by determining whether the thermistor bead is wet or dry. The signal conditioning circuit 120 includes a pulse generator circuit 129 that receives the voltage readings and generates a series of pulses for each bead 113a and 113b, as described in more detail below.

Figure 3:
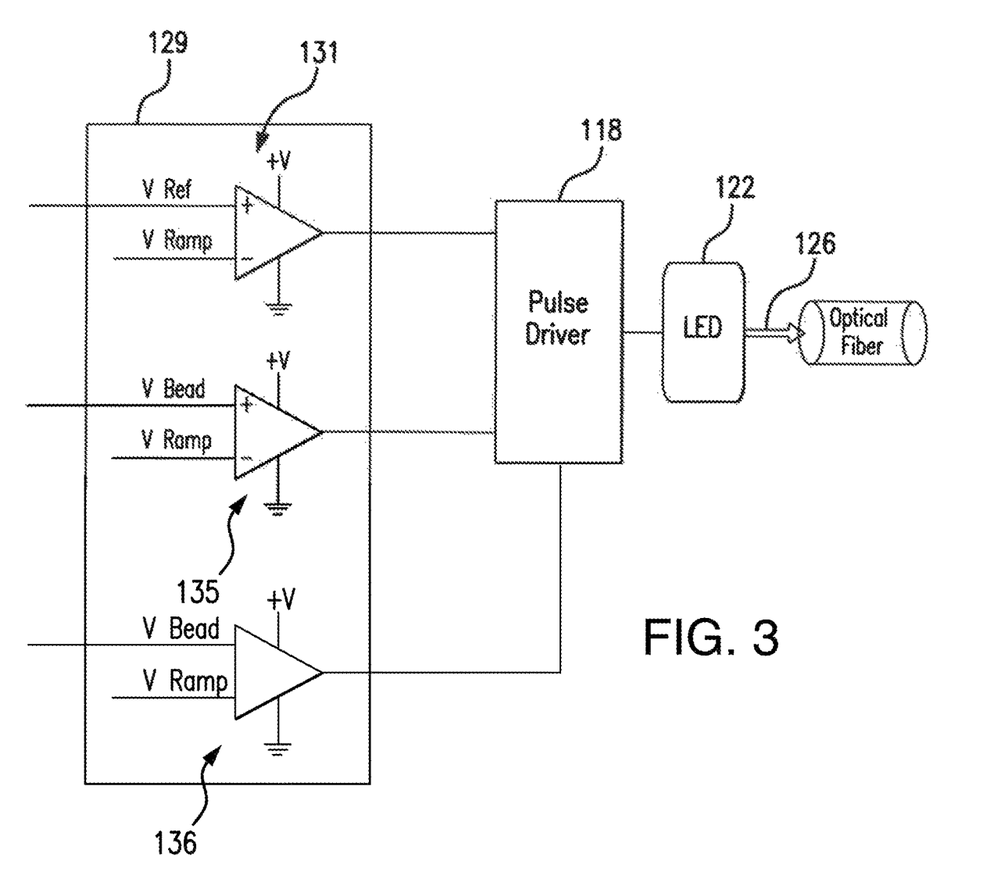
FIG. 3 is a schematic depiction of the connection between the output of the signal conditioning circuit and the pulse driver of the liquid level detection system of FIG. 1.
Figure 4:
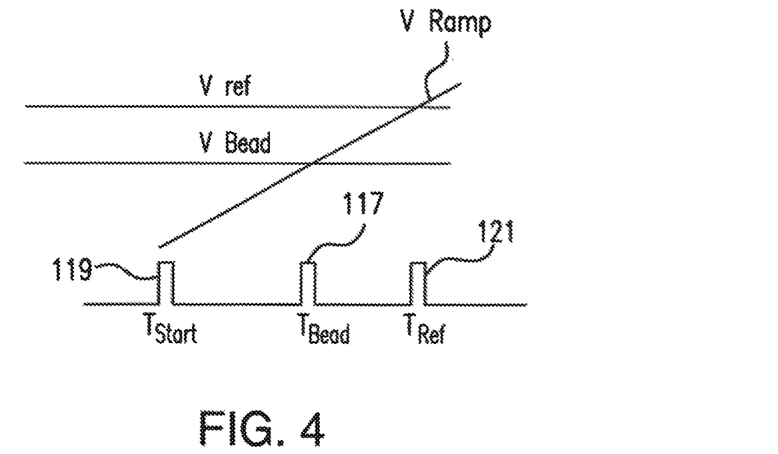
FIG. 4 is a schematic depiction of the three pulses generated by the pulse generator across the full scale of the thermistor bead voltage.

With reference now to FIGS. 3 and 4, thermistor beads 113a and 113b are excited with constant current sources of 10 and 20 mA. To measure and encode resistance of each thermistor bead 113a and 113b with respect to time the voltage across each bead, "V Bead", is compared to a linear ramp voltage, "V Ramp" with a comparator circuit 135. This is shown for one of beads 113a or 113b in FIG. 3. Those skilled in the art will readily appreciate that another comparator circuit, or a portion thereof, can be duplicated for the other thermistor bead as well. A pulse 117 is generated based on the comparison between the bead voltage and ramp voltage. Another comparator circuit 131 compares the ramp voltage to a fixed, reference voltage, "V Ref", that is greater in magnitude to the range of possible bead voltages for beads 113a and 113b. The signal conditioning circuit 120 is a low power circuit that uses a reduced amount of energy compared to traditional circuits connected to thermistor beads. Thermistor beads 113a and 113b are excited with constant current sources of 10 and 20 mA as described above.

With continued reference to FIG. 4, the pulse 117 is framed by a start pulse 119 that represents the start time of the measurement cycle, $T_{Start}$, and a framing pulse 121, that represents a reference time at some point later in the cycle, $T_{Ref}$. Start pulse 119 is created at the beginning of the measurement cycle. The framing pulse 121 is generated based on the comparison between the reference voltage and the ramp voltage. The reference voltage is greater in magnitude than the range of possible bead voltages. In this way, three pulses, 117, 119 and 121 are created in time. The start and framing pulses, 119 and 121, respectively, encode the full scale of possible thermistor bead voltages as delta time. The middle pulse, e.g. the pulse 117, defines the actual thermistor bead voltage for thermistor bead 113a, for example, as a time, $T_{Bead}$, along the full scale defined by $T_{Start}$ and $T_{Ref}$. It is contemplated that three separate pulses, 119, 121 and 117 can be generated for each thermistor bead 113a and 113b, resulting in the generation of a $T_{Start}$, $T_{Ref}$, and $T_{Bead}$ for each thermistor bead. It is also contemplated that the ramp direction can be reversed to mathematically remove circuit offset voltages.

As shown in FIGS. 1 and 3, the first optoelectronic interface 106 includes a pulse driver 118 operatively connected to an output 124 of a conditioning circuit 120 to signal an optical transmitter 122 to generate an optical, e.g. photonic, pulse based on electrical pulses 117, 119 and 121 received from the conditioning circuit 120. An output 126 of the optical transmitter 122 is coupled to the fiber optic cable 110 to provide the photonic power pulses to the second optoelectronic interface 108. The second optoelectronic interface 108 includes a photodiode 128 operatively connected to the fiber optic cable 110 to receive photonic power pulses therefrom and to generate corresponding electrical pulses. Photodiode 128 converts the photonic pulses back into electrical pulses corresponding to electrical pulses 117, 119 and 121. The system 100 includes a module 130 electrically coupled to the photodiode 128 of the second optoelectronic interface 108 to determine a liquid level based on the electrical pulses received from the photodiode 128. Module 130 includes optical power and/or health management controls 142 to monitor the status of the first and second optical interfaces and their respective components. Module 130 calculates a fractional thermistor bead voltage as a fractional bead time, Bead $T_f$, for each bead using the following equation:

$$\text{Bead } T_f = \frac{T_{Bead} - T_{Start}}{T_{Ref} - T_{Start}}$$

This results in two fractional thermistor bead voltages. The fractional thermistor bead voltage for first thermistor bead 113a is represented by Bead $T_{f1}$, and the fractional thermistor bead voltage for the second thermistor bead 113b is represented by Bead $T_{f2}$. Module 130 then takes the difference between the fractional voltages of each bead, e.g. the difference between Bead $T_{f1}$ and Bead $T_{f2}$, and compares the difference to a pre-determined threshold. If the difference is greater than the threshold, the sensor is wet and if the difference is less than the threshold, the sensor is dry. This is represented by the comparison below:

Bead $T_{f1}$–Bead $T_{f2}$>Treshold:Sensor is wet

Bead $T_{f1}$–Bead $T_{f2}$≤Treshold:Sensor is dry

Those skilled in the art will readily appreciate that diagnostics can be performed by applying a time window to the pulses. These windows can be established to determine a bead short circuit or low resistance out of range, a bead open or high resistance out of range. Timing windows can also be used to determine whether the overall circuit is working correctly. For example, if the framing pulses are too far apart in time then the data received are unreliable.

As shown in FIG. 1, an output 139 (e.g. a wet or dry determination) of module 130 is sent to a communications interface 132 and/or other processor to determine an overall point level inside the liquid storage vessel 104. For example, level sensors 102 can be placed at a low point and/or a high point in liquid storage vessel 104 to provide a threshold measurement. From that measurement, the communications interface 132 can generate a low fuel level warning and/or a high level shutoff to prevent over-filling. System 100 is a point liquid level detection that does not require electrical conductors used to interface with traditional point level sensors due to the use of the fiber-optic cable 110 to transmit power between the first and second optoelectronic interfaces, 106 and 108, respectively. This provides electric isolation, increased safety, and easier and faster installation over traditional point liquid level detection systems that typically use electrical conductors, e.g. wires, to operate.

Figure 5:
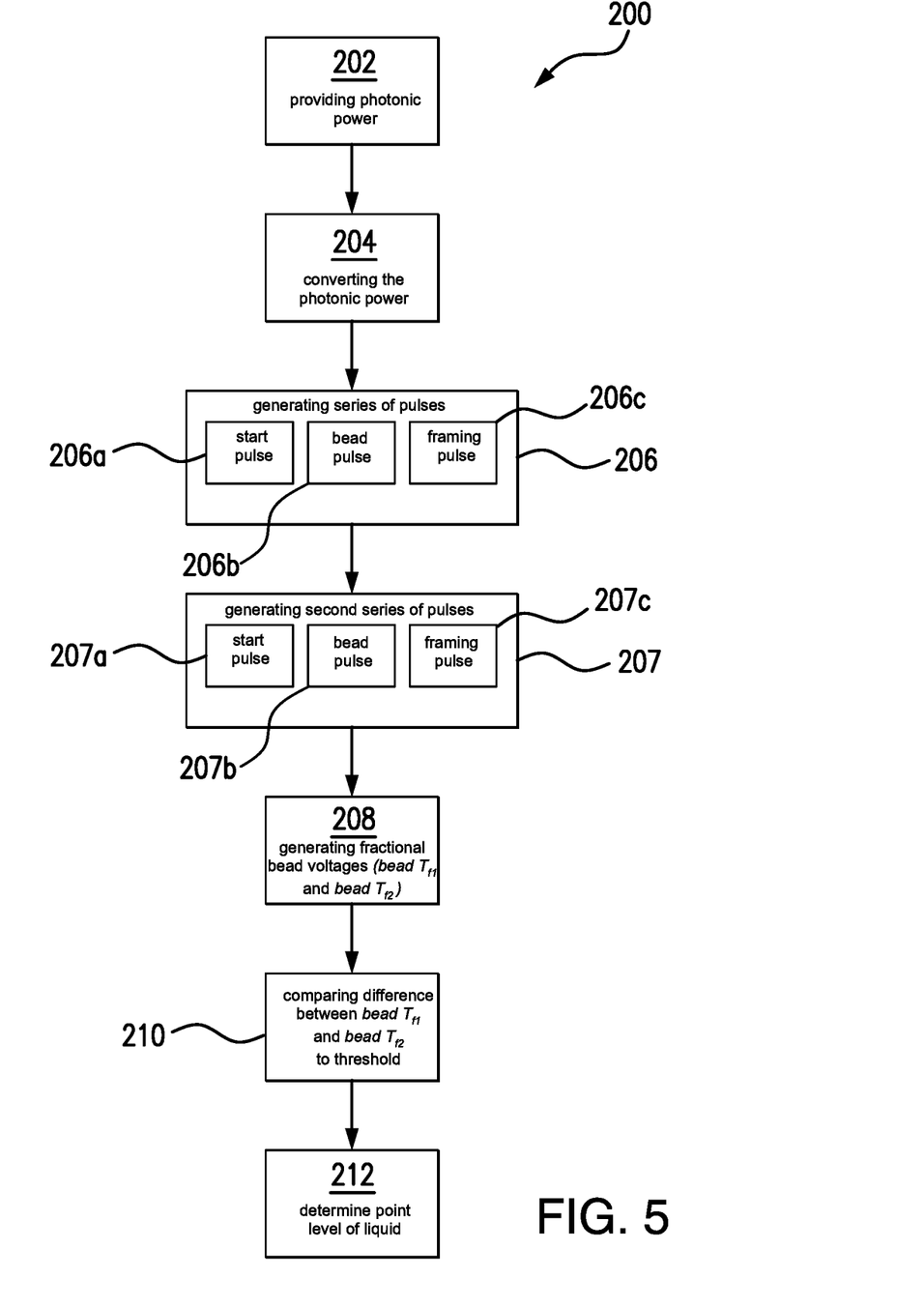
FIG. 5 is a flow chart schematically depicting a method for detecting a liquid level in a liquid storage vessel using the liquid level detection system of FIG. 1.

As shown in FIG. 5, a method 200 for detecting a liquid level in a liquid storage vessel, e.g. liquid storage vessel 104, includes providing photonic power to a first optoelectronic interface, e.g. first optoelectronic interface 106, through a fiber optic cable 110, as indicated by box 202. The method 200 includes converting the photonic power to electrical power using a power converter, e.g. power converter 114, and providing the electrical power to a signal conditioning circuit, e.g. signal conditioning circuit 120, to apply a voltage across a level sensor, e.g. dual thermistor bead sensor 112, during a measurement cycle, as indicated by box 204.

With continued reference to FIG. 5, the method 200 includes generating a series of electrical pulses, e.g. pulses 117, 119 and 121, with the signal conditioning circuit based on at least one voltage reading from a first thermistor bead, e.g. thermistor bead 113a, of the level sensor during the measurement cycle, as indicated by box 206. Generating the electrical pulses with the signal conditioning circuit includes generating a start pulse, e.g. start pulse 119, at a start of the measurement cycle, as indicated by box 206a. After the start pulse, the signal conditioning circuit generates a thermistor bead pulse, e.g. pulse 117, by comparing an actual thermistor bead voltage to a ramp voltage using a comparator circuit, e.g. comparator circuit 135, as indicated by box 206b. The last of the electrical pulses is a framing pulse, e.g. framing pulse 121, generated by comparing the ramp voltage to a reference voltage using a second comparator circuit, e.g. comparator circuit 131, as indicated by box 206c. The start and framing pulses encode a full scale of possible thermistor bead voltages as delta time, as shown in FIG. 4.

As shown in FIG. 5, method 200 includes generating a second series of thermistor bead pulses, similar to pulses 117, 119 and 121, for a second thermistor bead, e.g. thermistor bead 113b, with the signal conditioning circuit, as indicated by box 207. Generating the second series electrical pulses with the signal conditioning circuit includes generating a start pulse, e.g. start pulse 119, at a start of the measurement cycle, as indicated by box 207a. After the start pulse, the signal conditioning circuit generates a second thermistor bead pulse, e.g. pulse 117, by comparing an actual thermistor bead voltage to a ramp voltage using a comparator circuit, e.g. comparator circuit 135, as indicated by box 206b. The last of the electrical pulses for the second thermistor bead is a framing pulse, e.g. framing pulse 121, generated by comparing the ramp voltage to a reference voltage using a second comparator circuit, e.g. comparator circuit 131, as indicated by box 206c. The pulses for the second thermistor bead, for example, can be separately generated by another comparator circuit in a similar manner to the pulses for the first thermistor bead, described above.

It is contemplated that the thermistor beads can be interrogated with the comparator circuit in a variety of suitable ways. For example, an analog multiplexer can be used so that the same comparator circuit measures the first bead and the second bead. For example, measuring the first bead first, sending back three pulses as described above, and then switching the multiplexer to connect the second thermistor bead and measure that, sending back the three pulses representing the second thermistor bead's fractional resistance. Alternatively, each bead can have dedicated circuitry to excite and interrogate each thermistor. It is contemplated that the measurements would be time phased so as not to interfere with one another.

With continued reference to FIG. 5, the method 200 includes determining the liquid level based on the electrical pulses using a module, e.g. the module 130, in a second optoelectronic interface 108, e.g. the second optoelectronic interface 108, to generate fractional thermistor bead voltages, Bead $T_{f1}$ and Bead $T_{f2}$, based on the actual thermistor bead voltages encoded as time, $T_{Bead}$, for each respective thermistor bead relative to the full scale for each thermistor bead, as indicated by box 208. The equation for determining fractional thermistor bead voltages, Bead $T_{f1}$ and Bead $T_{f2}$ is the same as the equation for fractional thermistor bead voltage, Bead $T_f$, shown above. Determining the liquid level based on the electrical pulses using the module includes comparing the difference between the first and second fractional thermistor bead voltages to a threshold value to determine whether the level sensor is wet or dry, as shown by box 210, and as indicated by the comparison provided above. Once it is determined whether the level sensor is wet or dry, the module uses the wet/dry reading from the sensor are used to determine point level of the liquid in the storage vessel, as indicated in box 212.

The embodiments of the systems and methods described herein provide an intrinsically/inherently safe flammable liquid point liquid level detector for control during refuel situations or other situations where a discrete volume must be known by providing a nonelectrical interface and limiting external electrical components that could cause complications in a flammable environment. The methods described include signal conditioning that is very conservative of optical power relative to other systems for processing the thermistor measurements. While described herein with respect to flammable liquids such as fuel, the systems and methods described herein can be used with any fluid, given the correct dissipation factors.

The methods and systems of the present disclosure, as described above and shown in the drawings, provide for liquid level detection systems with superior properties including electrical isolation, reduced power requirement and ease of installation. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A liquid level detection system comprising:
   a dual thermistor bead level sensor configured to be at least partially disposed in a liquid storage vessel and exposed to liquid;
   a first optoelectronic interface operatively connected to the dual thermistor bead level sensor, wherein the first optoelectronic interface includes a signal conditioning circuit connected to the dual thermistor bead level sensor to provide electrical power to the dual thermistor bead level sensor and to receive voltage readings therefrom;
   a second optoelectronic interface operatively connected to the first optoelectronic interface; and
   a fiber optic cable optically connecting the first optoelectronic interface to the second optoelectronic interface to provide photonic power to the first optoelectronic interface and to transmit data from the first optoelectronic interface to the second optoelectronic interface, wherein the signal conditioning circuit includes:
      a first comparator circuit having a ramp voltage source input and a first actual thermistor bead voltage input, wherein the ramp voltage source input is independent from the dual thermistor bead level sensor, wherein the first comparator circuit is configured and adapted to compare a ramp voltage of the ramp voltage source input to a first actual thermistor bead voltage of a first thermistor bead of the dual thermistor bead level sensor during the measurement cycle,
      a second comparator circuit having a ramp voltage source input and a second actual thermistor bead voltage input, wherein the ramp voltage source input is independent from the dual thermistor bead level sensor, wherein the second comparator circuit is configured and adapted to compare a ramp voltage of the ramp voltage source input to a second actual thermistor bead voltage of a second thermistor bead of the dual thermistor bead level sensor during the measurement cycle, and
      a third comparator circuit having a ramp voltage source input and a reference voltage input, wherein the ramp voltage source input is independent from the dual thermistor bead level sensor, wherein the third comparator circuit is configured and adapted to compare a ramp voltage of the ramp voltage source input to a reference voltage of the reference voltage input during the measurement cycle.

2. The liquid level detection system as recited in claim 1, wherein the first optoelectronic interface includes a power converter in optical communication with the fiber optic cable to convert photonic power to electrical power, and an energy storage component in electrical communication with the power converter to store electrical energy converted by the power converter.

3. The liquid level detection system as recited in claim 2, wherein the signal conditioning circuit is operatively connected to the energy storage component, and wherein the voltage readings are indicative of a liquid level in a liquid storage vessel.

4. The liquid level detection system as recited in claim 3, wherein the first optoelectronic interface includes a pulse driver operatively connected to an output of the signal conditioning circuit to receive electrical pulses from the signal conditioning circuit.

5. The liquid level detection system as recited in claim 4, wherein the first optoelectronic interface includes an optical transmitter operatively connected to the pulse driver to receive signals therefrom and to generate photonic power pulses based on electrical pulses received from the signal conditioning circuit.

6. The liquid level detection system as recited in claim 5, wherein an output of the optical transmitter is coupled to the fiber optic cable to provide the photonic power pulses to the second optoelectronic interface indicative of a liquid level in a liquid storage vessel.

7. The liquid level detection system as recited in claim 1, wherein the fiber optic cable is a single fiber optic cable configured to transmit optical power from the second optoelectronic interface to the first optoelectronic interface and to the signal conditioning circuit of the first optoelectronic interface and to transmit data from the signal conditioning circuit of the first optoelectronic interface to the second optoelectronic interface.

8. The liquid level detection system as recited in claim 1, wherein the second optoelectronic interface includes a photodiode operatively connected to the fiber optic cable to receive photonic power pulses therefrom and to generate corresponding electrical pulses.

9. The liquid level detection system as recited in claim 8, further comprising a module electrically coupled to the photodiode of the second optoelectronic interface to determine a liquid level based on electrical pulses received from the photodiode.

10. A method for detecting a liquid level in a liquid storage vessel comprising:
providing photonic power to a first optoelectronic interface through a fiber optic cable;
converting the photonic power to electrical power using a power converter;
providing the electrical power to a signal conditioning circuit to apply a voltage across a dual thermistor bead level sensor during a measurement cycle;
generating a first thermistor bead electrical pulse based on comparing a first actual thermistor bead voltage of a first thermistor bead from the dual thermistor bead level sensor to a first ramp voltage during the measurement cycle;
generating a second thermistor bead electrical pulse based on comparing a second actual thermistor bead voltage of a second thermistor bead from the dual thermistor bead level sensor to a second ramp voltage during the measurement cycle;
generating at least one framing electrical pulse for determining reliability of the measurement cycle based on comparing at least one of the first or second ramp voltages to a reference voltage, wherein the first and second ramp voltages are independent from the dual thermistor bead level sensor; and
determining a liquid level based on the first and second thermistor bead electrical pulses using a module in a second optoelectronic interface, wherein the second optoelectronic interface is operatively connected to the first optoelectronic interface through the fiber optic cable.

11. The method as recited in claim 10, further comprising generating a respective start electrical pulse for each of the first and second thermistor beads at a start of the measurement cycle.

12. The method as recited in claim 11, wherein the start and framing pulses encode a full scale of possible thermistor bead voltages as delta time, and wherein each of the thermistor bead electrical pulses define a respective fractional thermistor bead voltage based on the actual thermistor bead voltage encoded as time relative to the full scale.

13. The method as recited in claim 12, wherein determining the liquid level based on the first and second thermistor bead electrical pulses using the module includes comparing the difference between the first and second fractional thermistor bead voltages to a threshold value to determine whether the level sensor is wet or dry.

* * * * *